United States Patent
Yang et al.

(10) Patent No.: US 12,521,832 B2
(45) Date of Patent: Jan. 13, 2026

(54) MONITORING MECHANISM, APPLICATION THEREOF, AND SLICING MACHINE WITH THE MONITORING MECHANISM

(71) Applicant: TCL ZHONGHUAN RENEWABLE ENERGY TECHNOLOGY CO., LTD., Tianjin (CN)

(72) Inventors: Xuzhou Yang, Tianjin (CN); Haoming Zhang, Tianjin (CN); Rui Wu, Tianjin (CN); Chen Wei, Tianjin (CN); Pengzhan Zhao, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 278 days.

(21) Appl. No.: 18/548,531

(22) PCT Filed: Jul. 31, 2023

(86) PCT No.: PCT/CN2023/110415
§ 371 (c)(1),
(2) Date: Aug. 31, 2023

(87) PCT Pub. No.: WO2024/046000
PCT Pub. Date: Mar. 7, 2024

(65) Prior Publication Data
US 2025/0025974 A1    Jan. 23, 2025

(30) Foreign Application Priority Data
Aug. 31, 2022 (CN) .......................... 202211061902.7

(51) Int. Cl.
*B23Q 17/20* (2006.01)
(52) U.S. Cl.
CPC .................................. *B23Q 17/20* (2013.01)

(58) Field of Classification Search
CPC ...... B23Q 17/20; B28D 5/0076; B28D 5/045; B28D 5/0064; G01N 27/90;
(Continued)

(56) References Cited

U.S. PATENT DOCUMENTS 5,036,706 A * 8/1991 Gnuechtel ............ G01N 33/346
340/675
10,150,172 B2 * 12/2018 Harris .................. G05B 19/402

FOREIGN PATENT DOCUMENTS

CN         105050759 A    11/2015
CN         105698322 A    6/2016
(Continued)

OTHER PUBLICATIONS

International Search Report in International application No. PCT/CN2023/110415, mailed on Oct. 19, 2023.
(Continued)

*Primary Examiner* — Tarun Sinha
(74) *Attorney, Agent, or Firm* — PV IP PC; Wei Te Chung

(57) ABSTRACT

A monitoring mechanism at least includes a monitoring unit, the monitoring unit is disposed in a slicing chamber and is configured to continuously monitor a state of a wire mesh and have no contact with the wire mesh. The monitoring mechanism of the present disclosure can continuously monitor the state of the wire mesh in the slicing chamber, especially accurately and timely track and monitor in a location of wire mesh nonstop in a non-contact way in a darkroom with serious vapor and a lot of silicon mud during slicing, which provides a solid foundation for precise determination of an abnormal wire mesh. The entire structure occupies a small space in the limited slicing chamber, and the structure is simple and safe such that data of the state of
(Continued)

the wire mesh can be obtained timely accurately to prevent a risk of missing or wrong determination.

19 Claims, 14 Drawing Sheets

(58) Field of Classification Search
CPC ............ G01N 2001/063; G01N 29/14; G01N 21/3563; G01N 2291/2697; G01N 23/02; G01N 25/20; G01N 2203/0053; G01N 3/068; G01N 2203/005
See application file for complete search history.

(56) References Cited

FOREIGN PATENT DOCUMENTS

| | | | |
|---|---|---|---|
| CN | 105984042 A | 10/2016 | |
| CN | 106313353 A | 1/2017 | |
| CN | 207373491 U | 5/2018 | |
| CN | 209440561 U | 9/2019 | |
| CN | 211363014 U | 8/2020 | |
| CN | 219159999 U | 6/2023 | |
| JP | 2003145407 A | 5/2003 | |
| WO | WO-2011070386 A1 * | 6/2011 | ............ B28D 5/045 |

OTHER PUBLICATIONS

Written Opinion of the International Search Authority in International application No. PCT/CN2023/110415, mailed on Oct. 19, 2023.

* cited by examiner

MONITORING MECHANISM, APPLICATION THEREOF, AND SLICING MACHINE WITH THE MONITORING MECHANISM

CROSS-REFERENCE TO RELATED APPLICATION

The present disclosure claims priority to and the benefit of Chinese Patent Application No. 202211061902.7 filed on Aug. 31, 2022, the disclosure of which is incorporated herein by reference in its entirety.

FIELD OF DISCLOSURE

The present disclosure relates to a field of monocrystalline silicon piece cutting technologies, especially relates to a monitoring mechanism, an application thereof, and a slicing machine with the monitoring mechanism.

BACKGROUND

During an operation of a slicing wire mesh, abnormal situations such as over large or small wire bows, jumping wires, and merged wires occurring on the wire mesh are frequent issues and directly influence slice quality and slicing efficiency. Conventional wire mesh monitoring is performed by manual and selective examination with human eyes, which not only has low efficiency and poor controllability, but also has very high manufacturing costs, and cannot solve technical issues of poor products, damaged apparatuses, and broken layers due to an abnormal wire mesh at all. During production, too much vapor frequently occurs in a sealed slicing chamber to directly utilize a camera to perform shooting and monitoring or directly observe the wire mesh from an observation window. An inspection can only be implemented after the wire mesh has issues and shuts down, which not only influences slice quality and has low workpiece utilization, but also seriously influences a production progress and increases manufacturing costs.

China Patent No. CN211762669U provides a jumping wire monitoring device for a hard and brittle material multi-wire cutting machine mainly configured to detect a wire mesh in an interval of a steel wire changing a direction and shutting down. At this time, vapor filled in a cutting region is minimal and would not influence photographing of the camera. The patent cannot monitor a state of the wire mesh during normal working of the slicing machine.

SUMMARY OF INVENTION

The present disclosure provides a monitoring mechanism, an application thereof, and a slicing machine with the monitoring mechanism, especially for application of monitoring a wire mesh during slicing, which solves a technical issue of a conventional technical unable to monitor a state of a wire mesh under a normal working condition of a slicing machine.

To solve at least one of the above technical issues, the present disclosure utilizes a technical solution as follows: a monitoring mechanism, at least including a monitoring unit, wherein the monitoring unit is disposed in a slicing chamber and is configured to continuously monitor a state of a wire mesh and have no contact with the wire mesh.

In some embodiment of the present disclosure, the monitoring unit is disposed toward any region of the wire mesh other than a region where a workpiece contacts the wire mesh and is disposed near the workpiece.

In some embodiment of the present disclosure, the monitoring unit is two, and the monitor units are disposed on two side surfaces of the slicing chamber and monitor the state of the wire mesh along a length direction of the workpiece; and the monitoring units disposed on the two side surfaces of the slicing chamber are disposed oppositely.

In some embodiment of the present disclosure, the monitoring units disposed on the two side surfaces of the slicing chamber monitor the wire mesh rotating along a first rotational direction and the wire mesh rotating along a second rotational direction, respectively; and the monitoring units disposed on the two side surfaces of the slicing chamber alternately monitor the state of the wire mesh when the wire mesh switches from one of the first rotational direction and the second rotational direction to the other of the first rotational direction and the second rotational direction.

In some embodiment of the present disclosure, the monitoring unit is at least equipped with a monitor, and a launch port of the monitor is disposed downward obliquely or vertically toward a side near the workpiece.

In some embodiment of the present disclosure, the monitor is a radar sensor or a laser sensor.

In some embodiment of the present disclosure, the monitoring unit further includes a casing and a position adjustment bar, the monitor is disposed in the casing, and a side of the casing which a launch port of the monitor faces is configured as a transparent surface; a lower end of the position adjustment bar is connected to a top portion of the casing, an end of the position adjustment bar connected to the casing is structured as an arc surface; and controlling the arc surface of the position adjustment bar adjusts a facing position of the launch port of the monitor.

In some embodiment of the present disclosure, the monitoring unit is suspended on a positioning unit disposed along a length direction of the slicing chamber, the positioning unit is disposed with a long passageway and a connection block, and the long passageway matches the connection block; and a mounting block is disposed under the connection block, an upper end surface of the mounting block is connected to a lower end surface of the connection block, and a side surface of an end portion of the mounting block is connected to an end of the position adjustment bar away from the monitor.

In some embodiment of the present disclosure, the monitoring mechanism further includes a cleaning unit disposed independently from the monitoring unit, the cleaning unit is disposed directly opposite to the launch port of the monitor and is disposed opposite to the monitor, and the cleaning unit is disposed at an end portion of the slicing chamber to clean a transparent surface corresponding to the launch port of the monitor when the monitoring unit stops.

In some embodiment of the present disclosure, the monitoring units disposed on two side surfaces of the slicing chamber correspond to two cleaning units, and are cleaned by the cleaning units respectively; or, the monitoring units disposed on the two side surfaces of the slicing chamber share the cleaning unit, and the cleaning unit alternately cleans the monitoring units disposed on the two side surfaces of the slicing chamber.

In some embodiment of the present disclosure, the cleaning unit is disposed with a cleaning element and a riser board, the riser board is disposed on one of side surfaces of the cleaning element, the cleaning element is connected to the riser board by a shaft, and the cleaning element is controlled to rotate around the shaft as a center such that the cleaning element is disposed opposite to the monitor.

In some embodiment of the present disclosure, a baffle and a guide plate are disposed on a top portion of the cleaning element, the baffle is connected to the cleaning element; the guide plate is connected to the riser board; the riser board, and the baffle and the guide plate form a channel with multiple bends.

In some embodiment of the present disclosure, an inner cavity and spraying holes communicating with the inner cavity are formed in the cleaning element, the inner cavity is connected to a gas pipe and a liquid pipe, and gas and liquid are mixed in the inner cavity and then flow out from the spraying holes.

An application of any one of the above monitoring mechanisms during a slicing process.

A slicing machine is disposed with any one of the above monitoring mechanisms.

Utilizing a monitoring mechanism designed by the present disclosure can continuously monitor the state of the wire mesh in the slicing chamber, especially accurately and timely track and monitor in a location of wire mesh nonstop in a non-contact way in a darkroom with serious vapor and a lot of silicon mud during slicing, which provides a solid foundation for precise determination of an abnormal wire mesh. The entire structure occupies a small space in the limited slicing chamber, and the structure is simple and safe such that data of the state of the wire mesh can be obtained timely accurately to prevent a risk of missing or wrong determination. The present disclosure also provides an application of the monitoring mechanism and a slicing machine disposed with the monitoring mechanism.

LIST OF REFERENCE SIGNS

| 10: Monitoring unit; | 20: Workpiece; | 30: Positioning unit; |
|---|---|---|
| 40: Cleaning unit; | 50: Sheave; | 60: Wire mesh; |
| 11: Monitor; | 12: Casing; | 13: Mounting bracket; |
| 14: Position adjustment bar; | 15: Boss; | |
| 31: Long passageway; | 32: Connection block; | 33: Mounting block; |
| 34: Partition board; | | |
| 41: Cleaning element; | 42: Installation bracket; | 43: Liser board; |
| 44: Auxiliary board; | 45: Guide plate; | 46: Shaft; |
| 47: Connection bracket; | 48: Baffle; | 49: Sink. |

DETAILED DESCRIPTION OF EMBODIMENTS

In a slice production process, a working state of a wire mesh 60 directly affects slice quality. Ideally, the wire mesh 60 is evenly distributed in a wire groove of a sheave 50 and a location of the wire mesh 60 and a point of tangency of an outer circle of the sheave 50 are at the same height. However, in actual slicing, the wire mesh 60 is pressed by a workpiece 20 and very easily generates a wire bow. Also, easily influenced by a cutting vibration and a high speed operation, the wire mesh 60 easily has risks such as a jumping wire, merged wire, or broken wire. During slicing, a slicing chamber is dark inside and has a lot of vapor, the cutting fluid and silicon mud splash seriously such that a working state of the wire mesh 60 cannot be detected while a slicing is performed. Namely, quality situation in the slicing process cannot be assured. Therefore, designing a monitoring mechanism 100 able to timely observe a location of the wire mesh 60 under bad conditions in a slicing process and obtain a movement trend thereof to timely obtain a working state of the wire mesh 60 is an important guarantee for improving slice quality and increasing production efficiency.

Attached drawings and specific embodiment are combined to describe the present disclosure in detail as follows.

Figure 1:
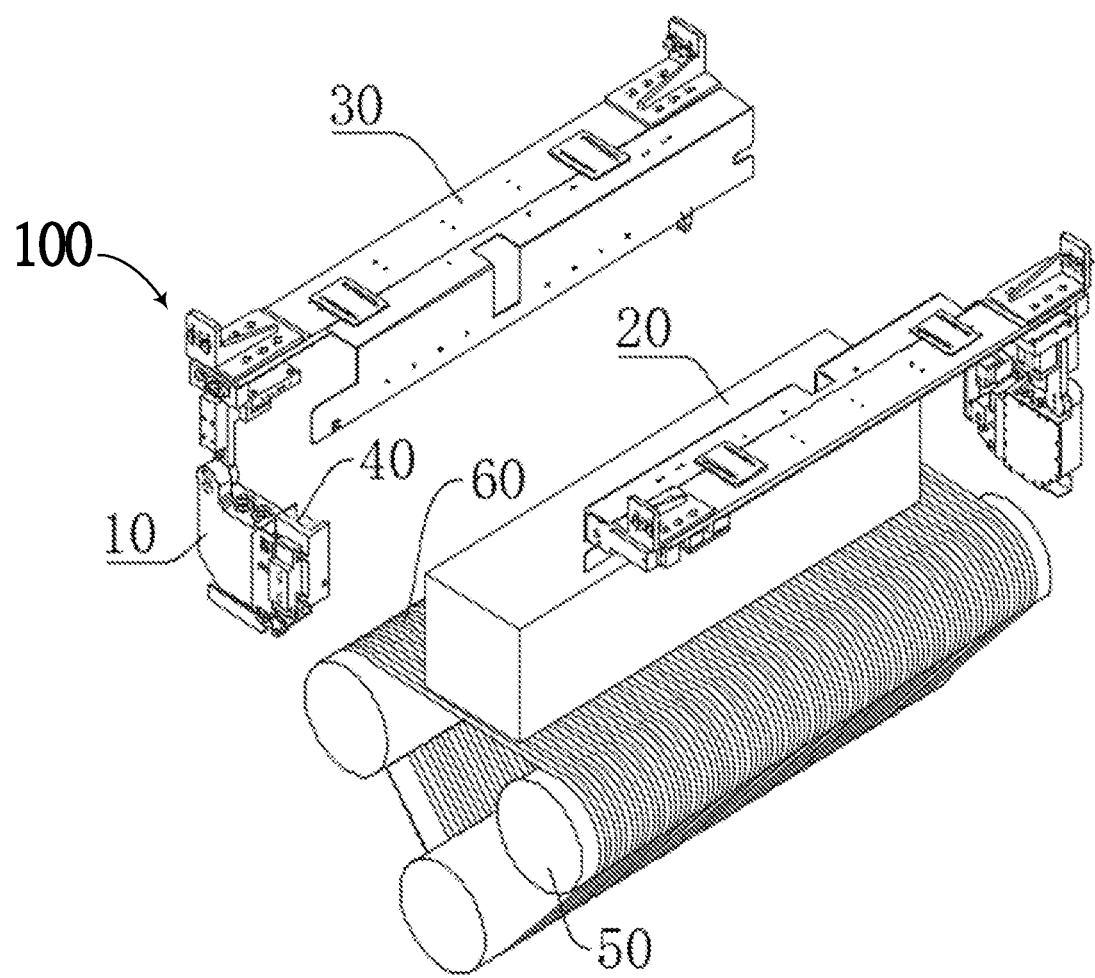
FIG. 1 is a perspective view of a of an embodiment of the present disclosure.
Figure 2:
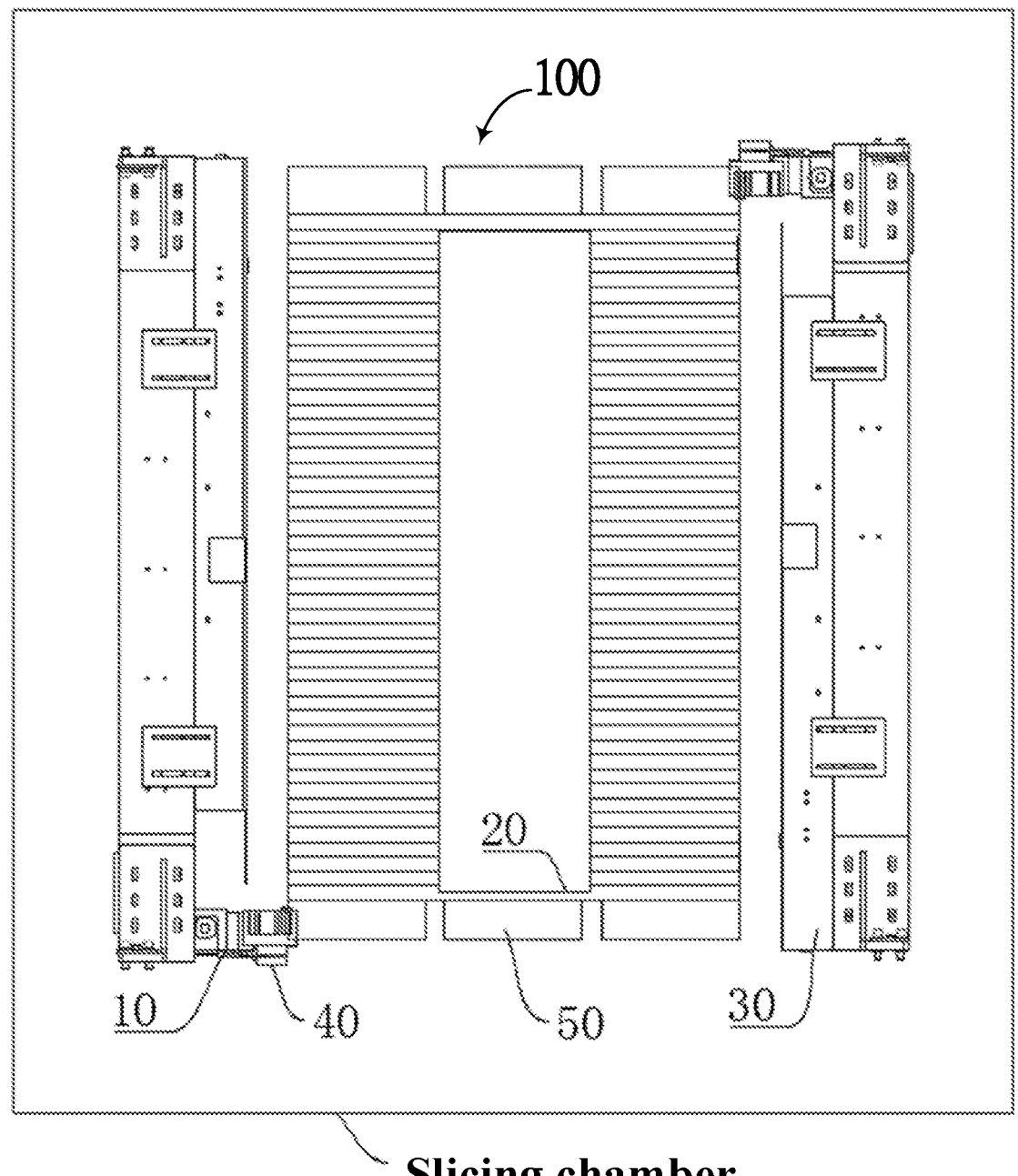
FIG. 2 is a top view of the monitoring mechanism of an embodiment of the present disclosure.
Figure 3:
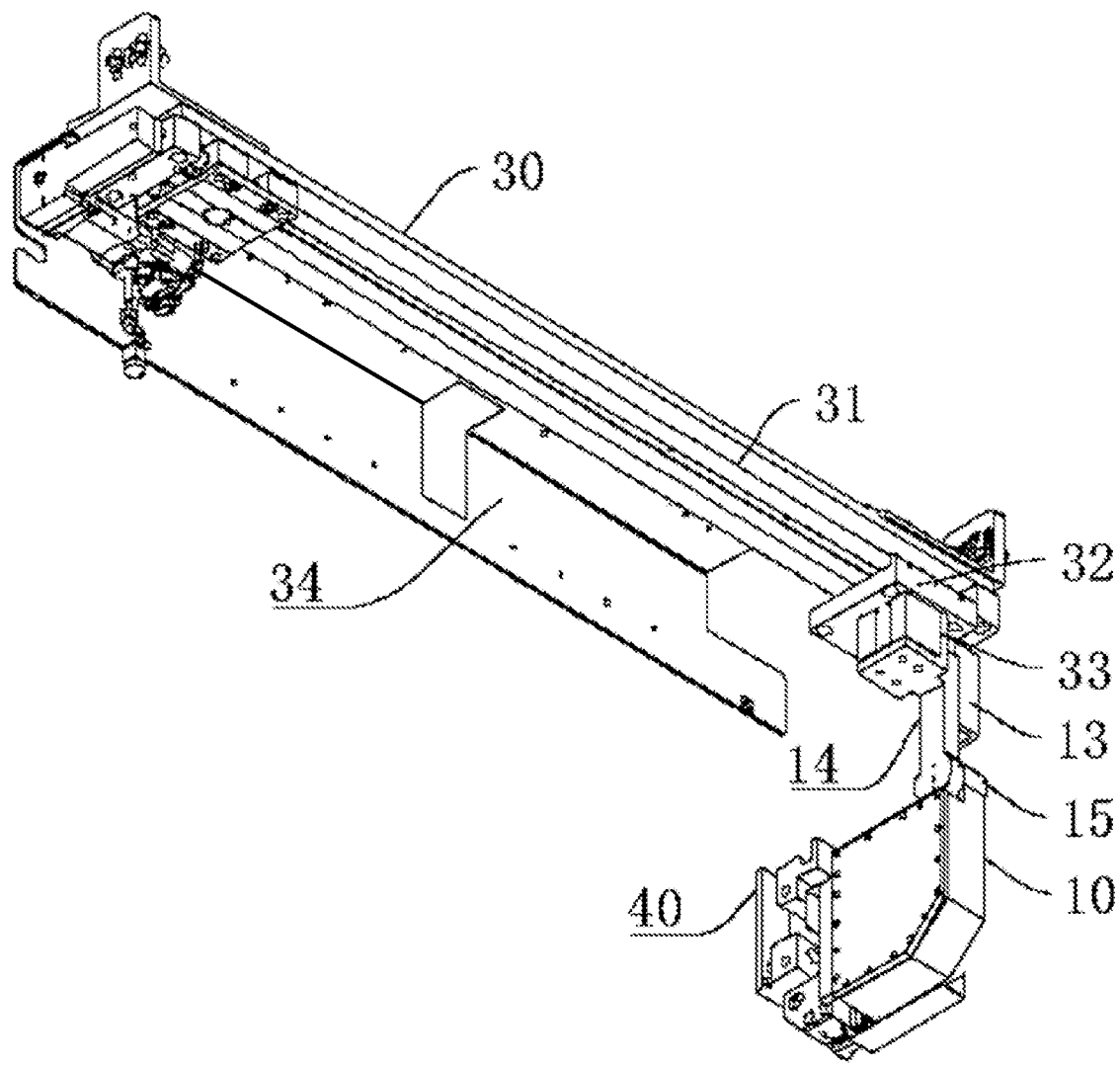
FIG. 3 is a bottom view of the monitoring mechanism of an embodiment of the present disclosure.

The present embodiment sets forth a monitoring mechanism 100. With reference to FIGS. 1 to 3, a slicing chamber is at least disposed with a monitoring unit 10 configured to monitor a wire mesh device, a positioning unit 30 configured to suspend the monitoring unit 10 and position a location of the monitoring unit 10, and a cleaning unit 40 configured to clean an outer wall surface of a detecting opening of the monitoring unit 10 inside. The monitoring unit 10 is suspended on the positioning unit 30 disposed along a length direction of the slicing chamber and is located on any side surface along a width direction of the wire mesh 60, namely, is located on two side surfaces along width direction of the slicing chamber, performs detection toward the width direction of the wire mesh 60, is configured to continuously and nonstop monitor a state of the wire mesh 60 and is disposed without contacting the wire mesh 60. The monitoring unit 10 and the cleaning unit 40 are disposed independently from each other. Nonstop tracking and monitoring the wire mesh 60 in a non-contact way such as radar detection, optical fiber medium detection or infrared sensor detection, whether in a slicing process or in a non-slicing process, can monitor the state of the wire mesh 60. The monitoring unit 10 is disposed on a side surface of the width of the wire mesh 60 and performs a location monitoring toward a cutting wire along the width direction of the wire mesh 60.

In the present embodiment, the monitoring unit 10 is at least equipped with one monitor 11. The monitor 11 is a sensor able to detect and recognize a height of the location of the wire mesh 60 and can be a radar sensor or a laser sensor. The monitor 11 of such type can continuously and nonstop monitor the location of the wire mesh 60 in each region, especially complete a detection to the location of the wire mesh 60 in the dark slicing chamber during slicing without influence from the vapor. It can be fixed on a certain place to perform detection to the wire mesh 60 and can also reciprocally move along a length direction of the wire mesh 60 to perform detection to the wire mesh 60. To improve continuity of detection, preferably, the monitor 11 moves along a length direction of the wire mesh 60 to perform detection to the height of the location of the cutting wire in each region to obtain dynamic and continuous cutting wire values.

The monitor 11 is used to detect the height of the location of the cutting wire in each region along the length direction of the wire mesh 60, first the monitor 11 disposed in the slicing chamber is controlled to sequentially detect the height of the location of the cutting wire in each region in the wire mesh 60 along the length direction of the workpiece 20 and obtain a lowest point value of the cutting wire in all regions. All of the regions are in predetermined equal divisions along the length direction of the workpiece 20. According to a height difference between a lowest point value of an arc surface of the cutting wire and a point of tangency between the cutting wire and the sheave 50 after detection, wire bow values of the cutting wire in all of the regions are obtained such that the wire bow value in each region in the wire mesh 60 can be known.

Preferably, the monitor 11 being a radar sensor is taken as an example. During work, the monitor 11 can realize detection to message of the location of the wire mesh 60 in each wire groove by an electromagnetic energy pulse in the slicing process, emits a signal to a reflective object of the wire mesh 60 and then the signal is reflected by the wire mesh 60 back into the monitor 11 such that a detection signal of the wire mesh 60 in each wire groove can be collected, and the collected detection signal is converted into a digital signal and then is transmitted to an external analyzing and processing central unit (not shown in figures) for computation and process. Then, after analysis and optimization, a curve chart indicating a state of the wire mesh can be obtained, a curve chart of time-wire bow value and a curve chart of region-wire bow value can be intuitively monitored. These attached drawings can be converted from obtained test data and are omitted here. Normality and abnormality of the state of the wire mesh 60, namely, abnormal issues of a jumping wire, merged wire, or broken wire, can be directly determined from the curve chart, which is very practical and has a coverage on the process at all. Therefore, a risk of missing or wrong determination due to monitoring a wire mesh by camera photography in a conventional technology can be avoided. Also, it is without influence from light intensity, which is not only strongly practical but also has a high determination accuracy such that a working state of the wire mesh 60 can be monitored in real time.

Figure 4:
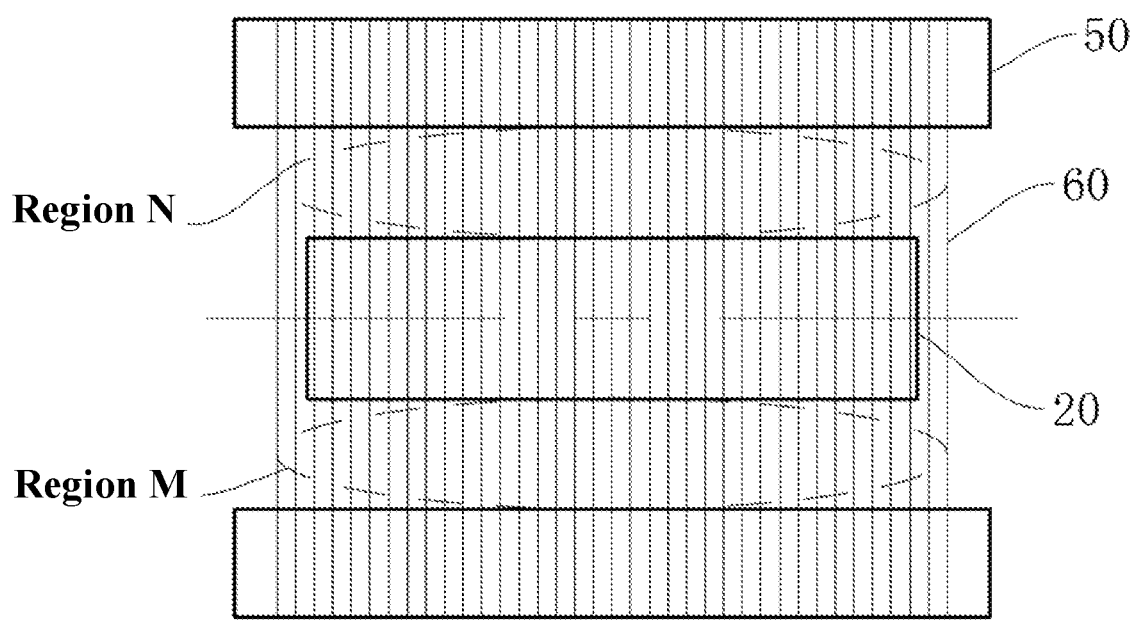
FIG. 4 is a top view of a monitor of an embodiment of the present disclosure emitted to a region in the wire mesh.

In particular, the monitor 11 in the monitoring unit 10 is disposed toward any region M or region N of the wire mesh 60 other than a region where the workpiece 20 contacts the wire mesh 60, as shown in FIG. 4, which prevents detective waves emitted by the monitor 11 from interfering with a location of the workpiece 20 during slicing and influencing accurate determination to the location of the wire mesh 60. Locations of the region M and region N can be exchanged.

Preferably, the wire mesh 60 is monitored during slicing, the monitor 11 is disposed toward any one of the region M or region N of the wire mesh 60 other than a region where the workpiece 20 contacts the wire mesh 60 and disposed near the workpiece 20, which has an objective to further monitor the state of the wire bow near the workpiece 20 while the location of the wire mesh 60 is determined such that a cutting situation to the workpiece 20 can be understood in detail.

Figure 5:
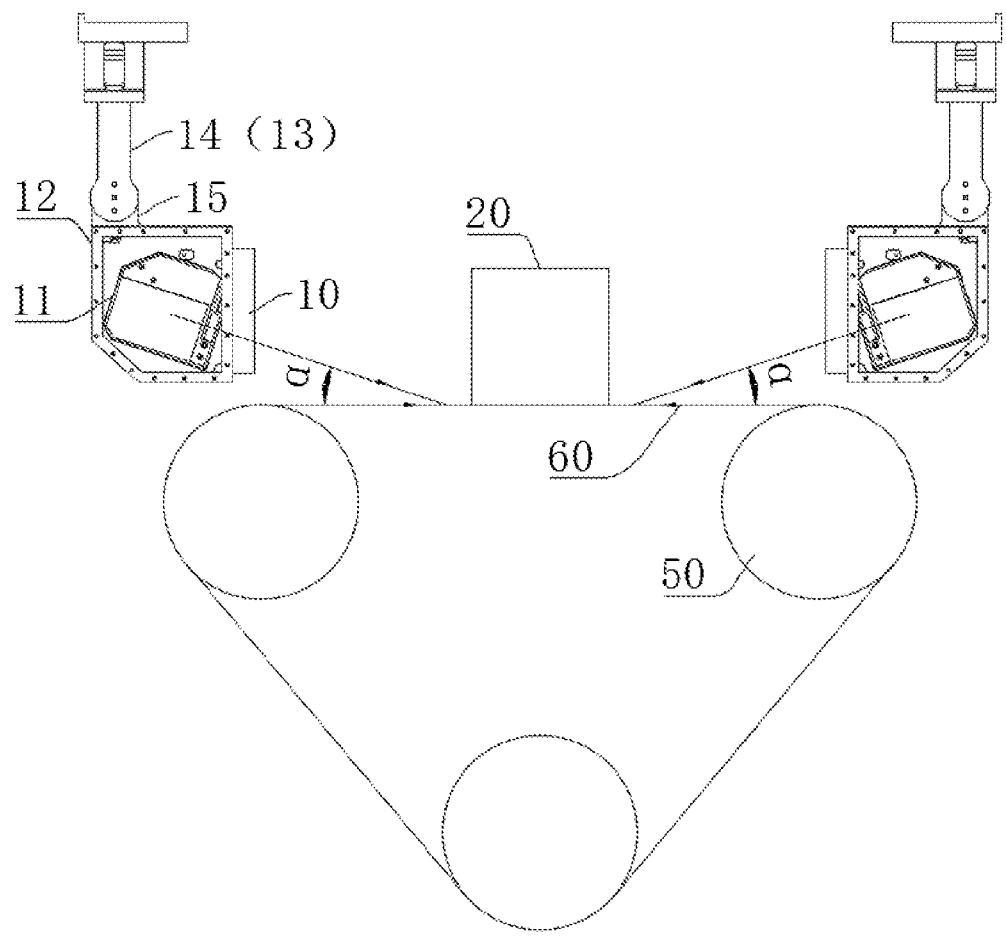
FIG. 5 is a schematic view of an orientation of a monitor launch port of an embodiment of the present disclosure.

A launch port of the monitor 11 is disposed downward obliquely toward a side of the wire mesh 60 near the workpiece 20, as shown in FIG. 5. At this time, the monitor 11 is located above a side of the wire mesh 60, and a detective light beam of the launch port thereof is disposed obliquely toward a side near the workpiece 20. At this time, not only a regional area of detection is large, but also the monitoring unit 10 is adjusted and installed easier, for a downward tilt angle of the monitor 11, the tilt angle α is an acute angle. As for a value of tilt angle, it can be determined based on the actual situation, and there is no specific limit here.

Figure 6:
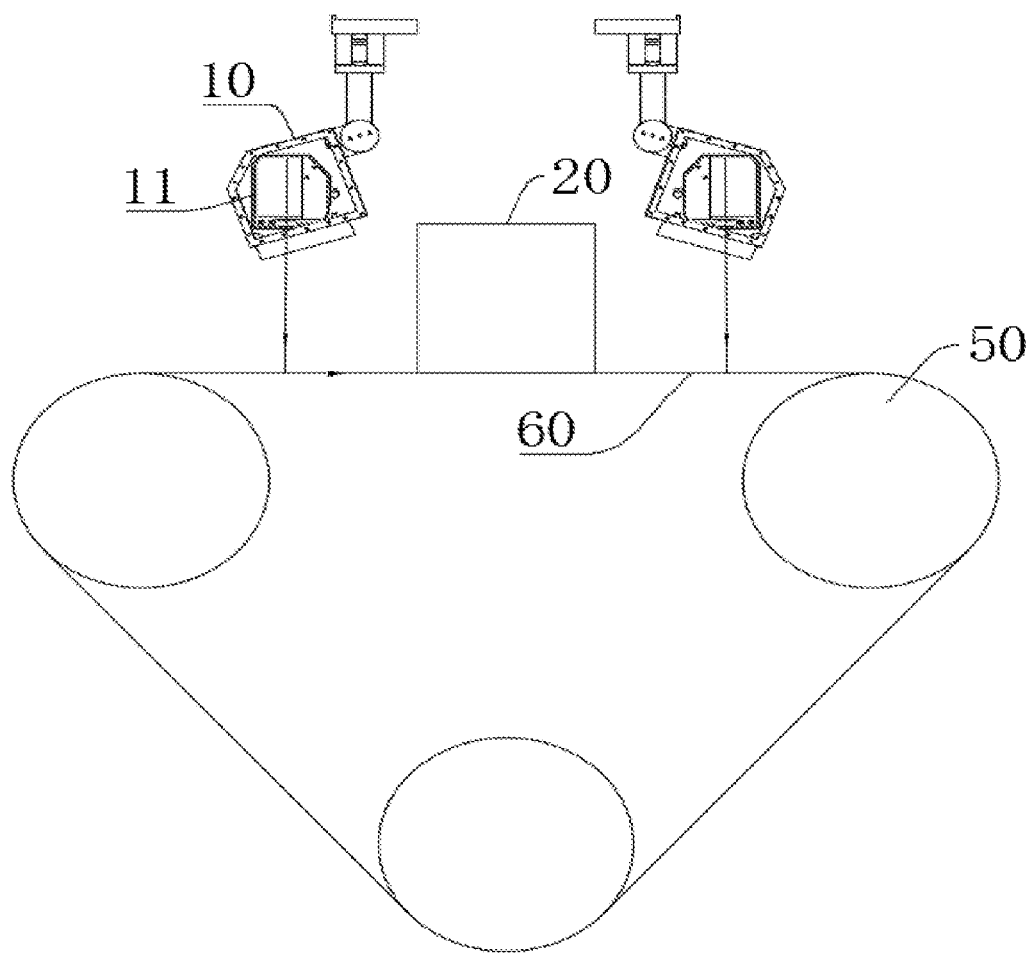
FIG. 6 is a schematic view of an orientation of the monitor launch port of another embodiment of the present disclosure.

Alternatively, the launch port of the monitor 11 is disposed vertically toward a side of the wire mesh 60 near the workpiece 20, as shown in FIG. 6, by this way, a location of a wire in each wire groove of the wire mesh 60 can also be detected and obtained.

During slicing, the wire mesh 60 moves reciprocally to cut the workpiece 20, and it has two rotational directions, namely, a forward rotation of the wire mesh 60 feeding the wire and a reverse rotation of the wire mesh 60 retracting the wire. The first rotational direction is the forward rotation of the wire mesh 60 feeding the wire, and the second rotational direction is the reverse rotation of the wire mesh 60 retracting the wire. Because the rotational direction of the wire mesh 60 directly influences a splashing direction of the cutting fluid, the cutting fluid splashes along the rotational direction of the wire mesh 60 when the wire mesh 60 rotates. When the wire mesh 60 rotates according to the first rotational direction, the cutting fluid splashes along a rotational direction of the wire mesh 60. When the wire mesh 60 retracts the wire in the reverse rotation, the cutting fluid splashes with the rotational direction of the wire mesh 60. Therefore, the launch port of the monitor 11 is required to be disposed along a rotational direction of the wire mesh 60. Namely, the launch port of the monitor 11 and the rotational direction of the wire mesh 60 rotates in the same direction, which can prevent the silicon mud or the cutting fluid from blocking a casing 12 outside the monitor 11 such that splashes of the cutting fluid and the silicon mud due to rotation of the wire mesh 60 can be reduced to guarantee accuracy of detection and recognition.

When the monitoring unit 10 is disposed on only one side of the width direction of the wire mesh 60 and can precisely monitor the state of the wire mesh 60 when the wire mesh 60 rotates in the same direction relative to the monitoring unit 10, namely, the first rotational direction. However, when the wire mesh 60 switches to the second rotational direction. At this time, the rotational direction of the wire mesh 60 is in a reverse direction relative to the monitoring unit 10. Although the state of the wire mesh 60 can also be monitored at this time, the wire mesh 60 rotating reversely brings a certain amount of the cutting fluid and the silicon mud right splashing at the launch port of the monitor 10 such that the cutting fluid and the silicon mud accumulate in the launch port of the monitor 10 to influence monitoring effect of the monitor 10.

Preferably, with reference to FIGS. 1 to 3 and 5, to guarantee that both the working state of the wire mesh 60 in the first rotational direction of the forward rotation and the working state of the wire mesh 60 in the second rotational direction of the reverse rotation can be monitored and detected, the monitoring units 10 are disposed on two sides along a width of the wire mesh 60, namely, on two side surfaces of the slicing chamber, and monitor the state of the wire mesh 60 along a length direction of the workpiece. Also, the monitoring units 10 disposed on the two sides along the width of the wire mesh 60 are disposed oppositely. The monitoring units 10 disposed on the two sides along the width of the wire mesh 60 also means the monitoring units 10 disposed on the two side surfaces of the slicing chamber.

In particular, the monitoring unit 60 detects the height of the location of the wire mesh in the first rotational direction and the second rotational direction when the wire mesh 60 rotates. For the wire mesh 60 of the first rotational direction, it rotates in the same direction relative to the monitoring unit 10 on a left side and rotates reversely relative to the monitoring unit 10 on a right side. For the wire mesh 60 of the second rotational direction, it rotates in the same direction relative to the monitoring unit 10 on the right side and rotates reversely relative to the monitoring unit 10 on the left side. When working, the monitoring units 10 disposed on the two sides along the width of the wire mesh 60 monitor the rotating wire mesh 60 of the first rotational direction and the rotating wire mesh 60 of the second rotational direction respectively. Furthermore, the monitoring units 10 disposed on the two sides along the width of the wire mesh 60 alternately monitor the state of the wire mesh 60 switching from one of the first rotational direction and the second rotational direction to the other of the first rotational direction and the second rotational direction.

Namely, when the wire mesh 60 performs slicing along the first rotational direction, its rotational direction is forward rotation relative to the monitoring unit 10 on the left side and is reverse rotation relative to the monitoring unit 10 on the right side. At this time, the monitoring unit 10 on the left side starts to work and the monitoring unit 10 on the right side stops working. The monitoring unit 10 on the left side moves along the length direction of the wire mesh 60 to complete continuously monitoring the working state of the wire mesh 60 along the first rotational direction till the first rotational direction is completed.

When the first rotational direction switches to the second rotational direction, its rotational direction is reverse rotation relative to the monitoring unit 10 on the left side and is forward rotation relative to the monitoring unit 10 on the right side, the monitoring unit 10 on the left side starts to return to an initial location, and the monitoring unit 10 on the right side starts to work. Similarly, the monitoring unit 10 on the right side monitors the working state of the wire mesh 60 in the second rotational direction according to a predetermined movement path till the second rotational direction finishes.

The above step is repeated till the slicing is completed to accomplish monitoring the state of the wire mesh 60 of the entire cutting process and realize clearly and accurately monitoring and detecting the wire mesh 60 in either rotational direction.

Figure 7:
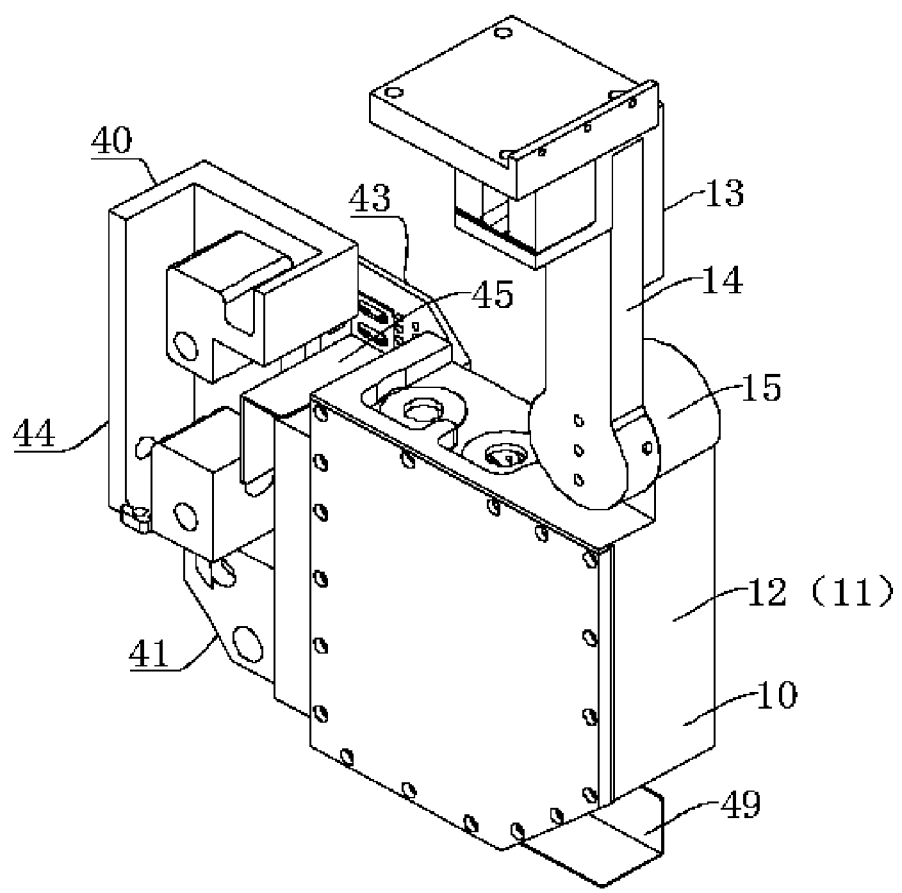
FIG. 7 is a location view of the monitoring unit and the cleaning unit of an embodiment of the present disclosure during cleaning.

With reference to FIG. 7, every time the monitoring unit 10 returns to its initial location and pauses from work, the cleaning unit 40 disposed opposite to the monitoring unit 10 can clean an outer wall surface of a launch port of the monitor 11 to quickly clean the cutting fluid or the silicon mud sticking to the outer wall surface and quickly dry water liquid after cleaning to complete drying the launch port of the monitor 11 outer wall surface to guarantee environmental cleaning effect when the monitor 11 works.

Figure 8:
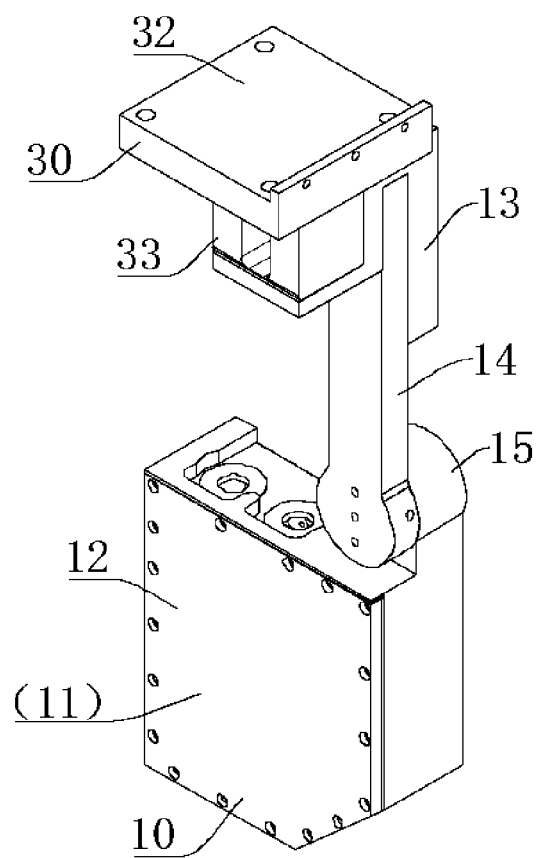
FIG. 8 is a perspective view of the monitoring unit of an embodiment of the present disclosure.
Figure 9:
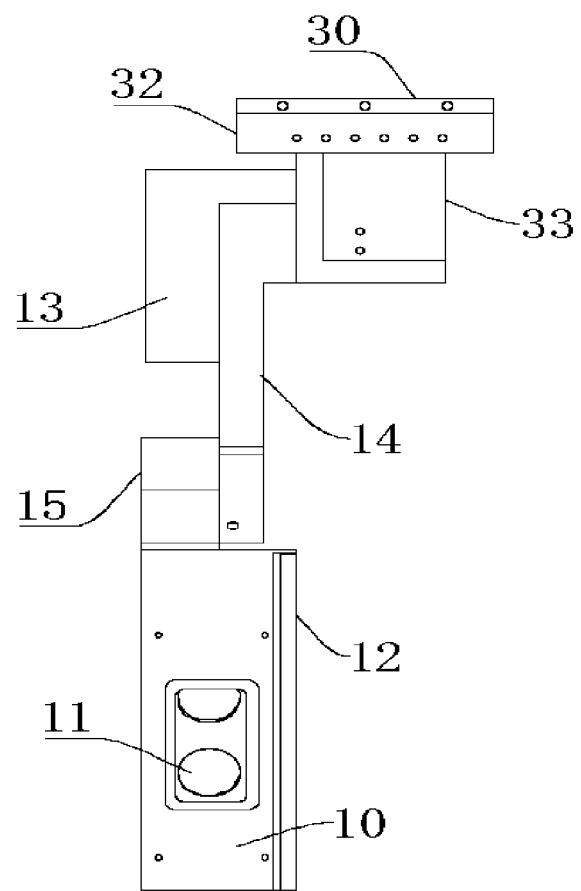
FIG. 9 is a front view of the monitoring unit of an embodiment of the present disclosure.
Figure 10:
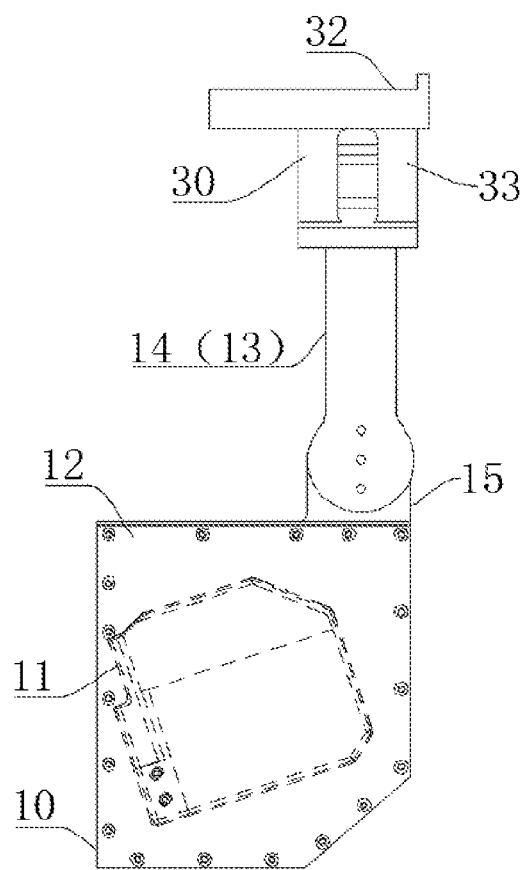
FIG. 10 is a side view of the monitoring unit of an embodiment of the present disclosure.

Furthermore, with reference to FIGS. 8 to 10, the monitor 11 is a flat square structure, a launch port and a receiving port are disposed on the same side surface of the monitor 11. Locations of the launch port and the receiving port can be exchanged. The launch port and the receiving port are disposed obliquely relative to the wire mesh 60. Namely, the launch port and the receiving port are disposed downward obliquely toward a side of the wire mesh 60, a tilt angle and a height can be set based on a space inside the slicing chamber, and there is no specific limit here.

The monitoring unit 10 further includes a casing 12 configured to protect the monitor 11, a position adjustment bar 14 configured to adjust a facing position of the launch port of the monitor 11, a mounting bracket 13 configured to fasten the casing 12, and a boss 15 configured to fasten the position adjustment bar 14. The monitor 11 is disposed in the casing 12, a side that the launch port of the monitor 11 in the casing 12 faces is disposed as a transparent surface to facilitate detection transmission and cleaning. A structure of the casing 12 matches a structure of the monitoring unit 10 and is also a flat square structure. In the casing 12, besides a side near the launch port of the monitor 11 is disposed as a transparent surface, other wall surface can also be disposed as a transparent surface or non-transparent surface. The casing 12 is a closed structure, which is not only dust-proof and waterproof, but also prevents cleaning fluid accumulation from entering the casing 12. The casing 12 can be made of material being high temperature resistant, moisture-proof and anti-electrical interference.

A lower end of the position adjustment bar 14 is connected to a boss 15 disposed on a top portion of the casing 12. An end of the position adjustment bar 14 connected to the boss 15 is structured as an arc surface, and the other end of the position adjustment bar 14 is disposed vertically. A connection point between the position adjustment bar 14 and the boss 15 is located at an end in the casing 11 away from the launch port of the monitor 11. The boss 15 is hinged to the position adjustment bar 14. Also, an arc surface of the position adjustment bar 14 is disposed along a length direction of the top portion of the casing 12 and is adjacent to the top portion of the casing 12 to control the casing 12 rotate along an end of the arc surface of the position adjustment bar 14 around the connection point between the position adjustment bar 14 and the boss 15 as a center of circle to adjust the location of the casing 12 such that the launch port of the monitor 11 is disposed obliquely or vertically toward a side of the wire mesh 60. The arc surface of an end of the position adjustment bar 14 near the casing 12 facilitates adjusting an angle of the casing 12 relative to the location of the wire mesh 60 to adjust locations of the launch port and receiving port of the monitor 11. After adjustment of the monitor 11 is completed, a threaded screw connects the position adjustment bar 14 and the boss 15 such that the monitor 11 is completely adjusted relative to the location of the wire mesh 60 angle and is completely secured in the casing 12.

The position adjustment bar 14 and the mounting bracket 13 are arranged abreast, abut each other, and are connected to each other. The mounting bracket 13 is disposed vertically at an end of the position adjustment bar 14 away from the monitor 11, both are structured as L-shaped structures, and both are connected to the mounting block 33 in the positioning unit 30. A purpose of the L-shaped structures is for adjusting the monitoring unit 10 along a length direction of the sheave 50, namely, the width of the wire mesh 60. The mounting bracket 13 is located at an upper end of the boss 15 and is disposed at an interval from the boss 15, namely, an end of mounting bracket 13 near the casing 12 is disposed at an interval from the casing 12.

With reference to FIG. 3, the monitoring unit 10 is suspended on the positioning unit 30 disposed along a length direction of the slicing chamber, namely, a length direction of the sheave 50. The positioning unit 30 is disposed with a long passageway 31 and a connection block 32 matching the long passageway 31. A top portion of the connection block 32 is connected to the long passageway 31. The long passageway 31 can be a slide rail or a transport such as a rail chain or belt, and the connection block 32 is a matching slide member. Namely, a set of the monitoring unit 10 and the positioning unit 30 is disposed along the width direction of the wire mesh 60, and the positioning unit 30 is disposed on the top portion of the slicing chamber.

Furthermore, a mounting block 33 is disposed under the connection block 32, an upper end surface of the mounting block 33 is connected to a lower end surface of the connection block 32, and a side surface of an end portion of the mounting block 33 is connected to ends of the position adjustment bar 14 and mounting bracket 13 away from the monitor 11. The mounting block 33 is structured as a square structure with an inner hole slot, and the inner hole slot is formed along its length direction and defined through a side surface of an end away from the position adjustment bar 14. Namely, the inner hole slot is formed along its length direction, namely, along the length direction of the sheave 50, and is defined through a side surface of an end away from the position adjustment bar 14. A side surface of an end portion of the mounting block 33 is adjacent and connected to a side of the position adjustment bar 14 away from mounting bracket 13. Disposing the mounting block 33 not only supports the connection block 32 and the position adjustment bar 14 in strength to connect and guarantee vertical installation of a radar sensor but also secures a wire axis to facilitate slicing wiring.

Furthermore, a partition board 34 is disposed on a side of the long passageway 31 away from the monitor 11 and along its length direction. The partition board 34 is structured as a L-shaped folding plate structure along its width direction, and a part of the partition board 34 is horizontally carried on a side of the long passageway 31, another part of the partition board 34 vertically extends, which is purposed for installation of a cable and a drag chain and for connection with a cable of the monitoring unit 10 and a cable electrically connected to the external analyzing and processing central unit.

With reference to FIGS. 1 to 2, 7, and 11, the cleaning unit 40 is disposed directly opposite to the launch port of the monitor 11. The cleaning unit 40 is disposed on an end portion of the slicing chamber to clean a transparent surface on the casing 12 corresponding to the launch port of the monitor 11 when the monitoring unit 10 stops. The cleaning unit 40 and the monitoring unit 10 are disposed independently from each other. During cleaning, the transparent surface of the casing 12 is vertically disposed and is directly opposite to the cleaning unit 40. When the monitoring unit 10 completes monitoring the first rotational direction or second rotational direction of the wire mesh 60 and returns to the initial location to stop, the silicon mud and the cutting fluid cover the transparent surface in the casing 12 corresponding to the monitor 11, the cleaning unit 40 disposed in front of the monitoring unit 10 can spray liquid to clean the transparent surface to guarantee that the monitor 11 in work of a next round can precisely recognize the location of the wire mesh 60 through the cleaned transparent surface to accurately determine the working state of the wire mesh 60.

The cleaning unit 40 disposed independently from the monitoring unit 10 can test a pressure when the monitoring unit 10 works such that gas and liquid are sufficient to clean the silicon mud and the cutting fluid on the transparent surface of the casing 12 when the monitoring unit 10 returns to the initial location. Also, an entire weight of the monitoring unit 10 can be reduced to simplify a distribution structure of the gas pipe and the liquid pipe, optimize the structure of the monitoring unit 10, and improve operability of the overall coordination. Furthermore, independently disposing the cleaning unit 40 can reduce an area occupied by the monitoring unit 10 to further simplify oppositely disposed movable structure carrying the monitoring unit 10 to lower an entire area required by the monitoring unit 10 in movement and improve space utilization of the monitoring mechanism 100. Moreover, a lot of silicon mud and cutting fluid are generated during slicing, utilizing a cleaning unit 40 integrated with the monitoring unit 10 would increase a risk of obstructed circuit conduction and motor assemblies. Therefore, the cleaning unit 40 needs to be separated from the monitoring unit 10, the cleaning unit 40 needs to be connected to a safe location and disposed at the end portion of the slicing chamber away from the location of the wire mesh 60, which also can prevent the silicon mud from falling on the wire mesh 60 during cleaning.

With reference to FIGS. 1 and 7, each monitoring unit 10 is disposed with a cleaning unit 40, namely, a cleaning unit 40 is disposed directly opposite to each monitoring unit 10 and is disposed opposite the monitor 11, which includes but is not limited to the monitoring unit 10 disposed on a single side of the width direction of the wire mesh 60 and the monitoring units 10 disposed on two sides of the width direction of the wire mesh 60. Furthermore, each cleaning unit 40 is disposed securely at an end portion of the slicing chamber.

Figure 11:
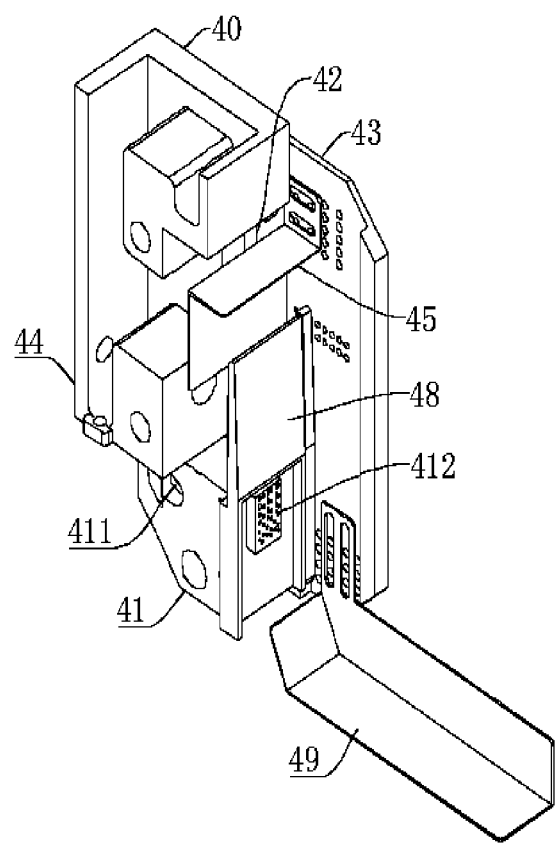
FIG. 11 is a perspective view of the cleaning unit of an embodiment of the present disclosure.
Figure 12:
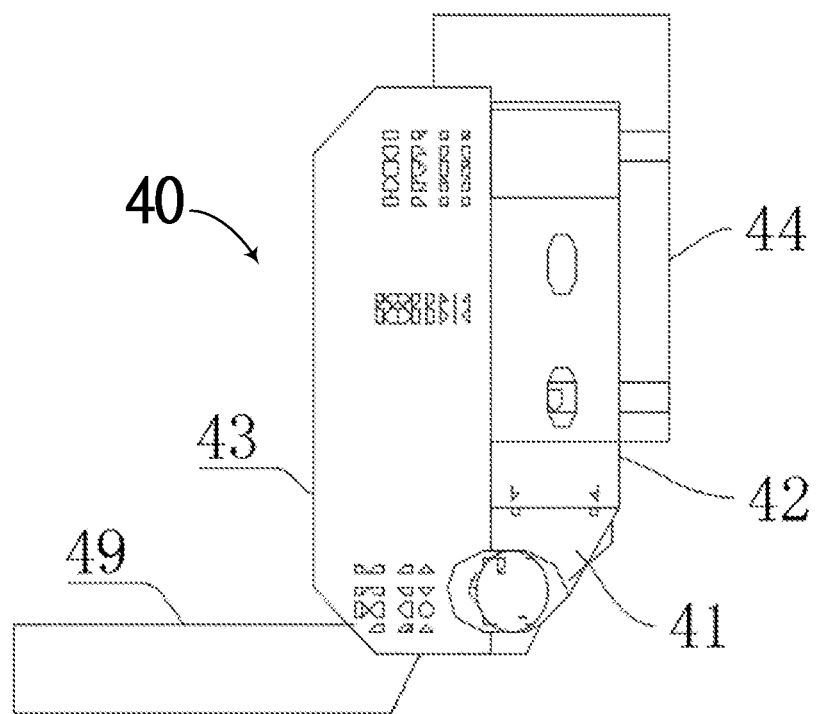
FIG. 12 is a rear view of the cleaning unit of an embodiment of the present disclosure.

In particular, with reference to FIGS. 11 and 12, the cleaning unit 40 includes a cleaning element 41, an installation bracket 42, a riser board 43, an auxiliary board 44, and a guide plate 45. The installation bracket 42 is located on a rear side surface of the cleaning element 41, and the installation bracket 42 and the riser board 43 are disposed in the same side surface of the cleaning element 41. The cleaning element 41 is connected to the riser board 43 by a shaft and controls the cleaning element 41 to rotate around the shaft as a center such that the cleaning element 41 is disposed opposite to the monitor 11. A baffle 48 and the guide plate 45 are disposed on a top portion of the cleaning element 41. The baffle 48 and the cleaning element 41 are integrally connected and disposed, are located a top portion on a side of the cleaning element 41 near the monitor 11, and extend upward. The guide plate 45 is a L-shaped folding plate structure, is connected to the riser board 43, and a part of the guide plate 45 is disposed abreast with the baffle 48. A sink 49 is disposed on a lower end surface of the riser board 43 and near a side of the monitor 11. The sink 49 is suspended on and connected to the riser board 43. The riser board 43 is disposed and protrudes along a width direction of the cleaning element 41. The riser board 43 serves as a side surface, the baffle 48 and the guide plate 45 form a channel with multiple bends, and a top of the guide plate 45 right blocks an end surface of the launch port of the monitor 11 in the casing 12. The end surface of the launch port of the monitor 11 in the casing 12 is adjacent to a spray liquid end surface of the cleaning element 41. The end surface of the launch port of the monitor 11 in the casing 12, the spray liquid end surface of the cleaning element 41, the baffle 48, the guide plate 45, and the riser board 43 are commonly disposed around to form a ventilated hollow chamber to guarantee that gas and liquid fluid sprayed out from the cleaning element 41 maximally washes a transparent surface that the launch port of the monitor 11 faces in the casing 12. Vapor can be discharged along a channel with multiple bends, but water liquid in the fluid is prevented from splashing. The washed silicon mud and cutting fluid are collected by the sink 49. When the cleaning element 41 cleans the casing 12, the vapor can spread outward along the channel with multiple bends to prevent the vapor from reverse flow such that the vapor cannot accumulate in the casing 12, which broadens diffusion area and velocity and improves cleaning effect. The water liquid and the silicon mud can be enclosed and blocked by an open structure formed by the riser board 43 and the baffle 48 without splashing to another location, which prevents secondary pollution to an outer wall surface of the casing 12. Also, the sink 49 can collect the cleaned silicon mud and water liquid, prevent them from flowing into another place of the slicing chamber, and also prevent them from falling into the wire mesh 60 or the sheave 50.

Furthermore, the installation bracket 42 is disposed along the width direction of the wire mesh and is connected to an end wall of the slicing chamber. The cleaning element 41 is connected to the installation bracket 42 and is located under the installation bracket 42. The riser board 43 is disposed on a side surface of a side of the installation bracket 42 near the monitor 11 and is stacked abreast with and connected to the installation bracket 42, and a lower end surface of the riser board 43 is hinged to the cleaning element 41.

A hole hinged to the riser board 43 is defined in a lower portion of the cleaning element 41 and is connected to the riser board 43 by an active shaft. The hinged shaft serves as a center of circle, a rotational angle of the cleaning element 41 is adjusted such that an end surface in which spraying holes 412 in the cleaning element 41 are located is directly opposite to the transparent surface corresponding to the monitor 11 in the casing 12 to guarantee that the end surface in which the spraying holes 412 are located is disposed abreast with the transparent surface corresponding to the monitor 11 in the casing 12. The auxiliary board 44 is configured to place a gas pipe supplying gas and a liquid pipe supplying liquid. The auxiliary board 44 is located above a side of the cleaning element 41 and is connected to a side surface of the installation bracket 42 near the cleaning element 41, and is defined with a through hole through which the gas pipe and the liquid pipe extend. The riser board 43 is located on a side of the cleaning element 41 away from a surface communicating with the liquid pipe, which not only facilitates securing the cleaning element 41 but also prevents water liquid from splashing to better facilitate cleaning effect of the cleaning element 41 to the casing 12.

Figure 13:
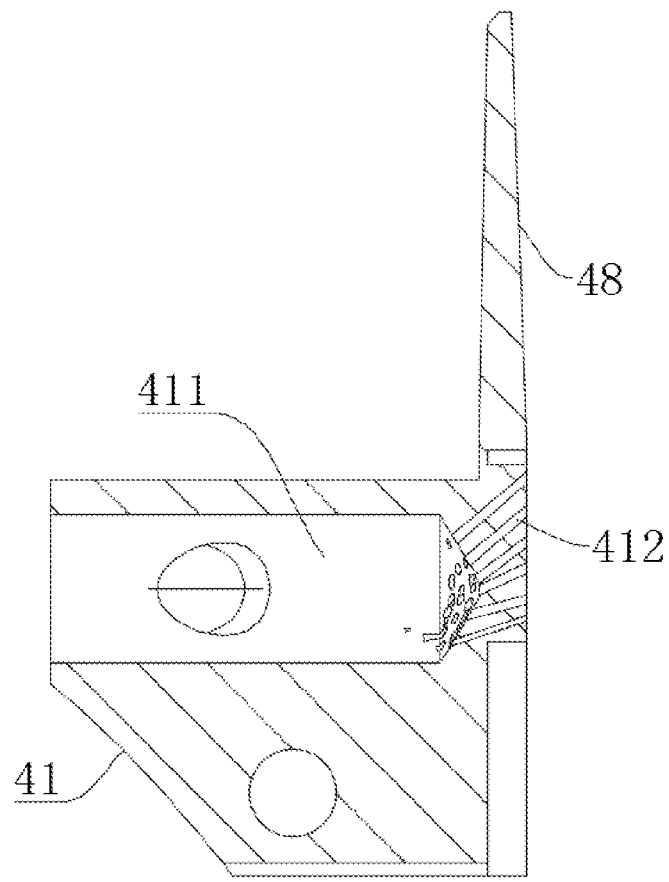
FIG. 13 is a cross-sectional view of the cleaning element of an embodiment of the present disclosure.

With reference to FIG. 13, the cleaning element 41 is formed with an inner cavity 411 and several spraying holes 412 communicating with the inner cavity 411 inside. The inner cavity 411 is connected to the gas pipe and the liquid pipe. The gas flowing from the gas pipe and liquid flowing from the liquid pipe are mixed in the inner cavity 411 to form gas and liquid fluid, and then flow out from the spraying holes 412 to spray and clean the transparent surface of the casing 12 corresponding to the launch port of the monitor 11. The gas and liquid, after entering the inner cavity 411 and mixed, are sprayed to the transparent surface in the casing 12 corresponding to the launch port of the monitor 11 through the spraying holes 412 such that the silicon mud on the transparent surface can be cleaned to further guarantee cleaning of the transparent surface. A side of the inner cavity 412 near the spraying holes 412 is an arc surface structure such that lengths of the spraying holes 412 are unequal, which has a purpose to increase spray flow in the middle spraying holes 412. Also, flow channels of upper and lower parts of the spraying holes 412 in the middle are oblique toward the transparent surface of the casing 12 corresponding to the launch port of the monitor 11. Preferably, flow channels of upper ones of the spraying holes 41 in the middle2 downward obliquely perform spraying, flow channels of lower ones of the spraying holes 41 in the middle2 upward obliquely perform spraying, which is purposed for improving a coverage area of water liquid of the spraying holes 412 and also increasing a velocity of flow of the spray liquid. The cross-disposed spraying holes 412 can further increase a flow of the spray liquid and improve cleaning efficiency.

When the monitoring unit 10 in the width of the wire mesh completes monitoring the wire mesh, returns to its initial location, and stops, the cleaning unit 40 corresponding to the monitoring unit 10 can clean a transparent surface corresponding to the launch port of the monitor 11 in the casing 12 in the monitoring unit 10. In an initial stage of cleaning, an external gas and liquid valve makes less gas and greater liquid such that the silicon mud and the cutting fluid quickly on the casing 12 are cleaned. In a late stage of cleaning, the amount of gas and liquid is adjusted to be greater gas and less liquid such that water liquid on the transparent surface of the casing 12 can be evaporated by gas to make the transparent surface transparent and bright. After cleaning, the cleaning unit 40 shuts down, the monitoring unit 10 is ready to monitor the wire mesh rotating in the same direction as the launch port of the monitor 11 in a next round.

Figure 14:
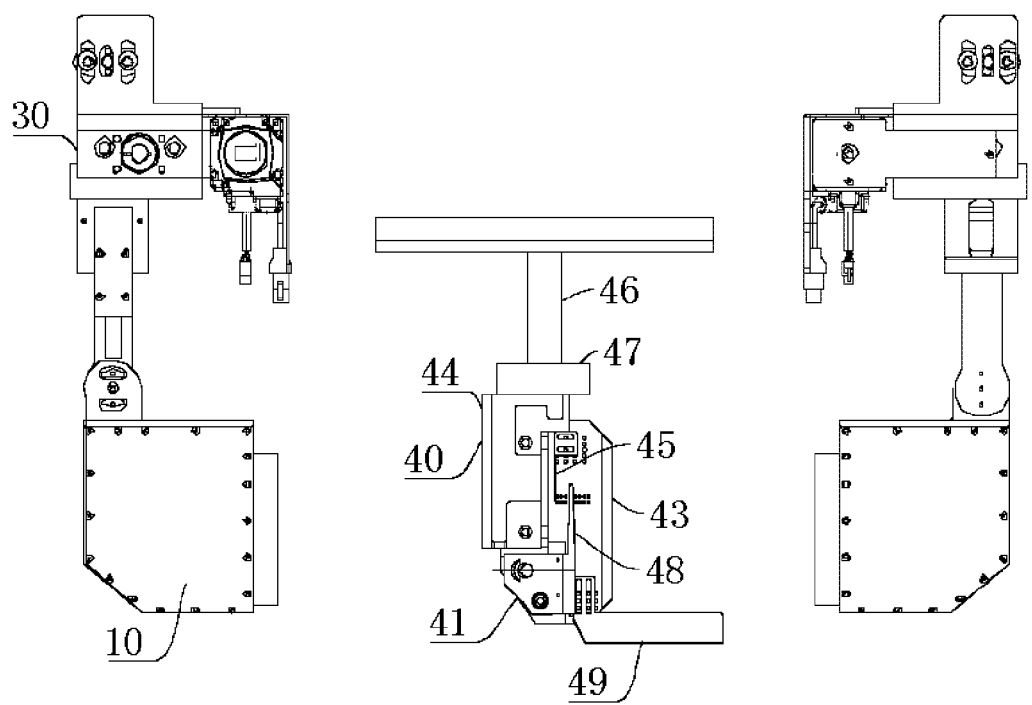
FIG. 14 is a schematic view of two monitoring units sharing one cleaning unit of another embodiment of the present disclosure.

With reference to FIG. 14, a greatest difference of the present embodiment from an embodiment in FIG. 11 is that the monitoring units 10 disposed on the two side surfaces of the slicing chamber share the same cleaning unit 40. The cleaning unit 40 is suspended on a top portion of the slicing chamber and is located on a middle location of a width between the monitoring units 10. The cleaning unit 40 further includes a shaft 46 disposed vertically and a connection bracket 47 connecting the shaft 46 and the cleaning element 41. The shaft 46 can be disposed vertically and can be disposed horizontally. The shaft 46 is connected to the cleaning element 41 by the connection bracket 47. At this time, the installation bracket 42 is secured at an end portion of the slicing machine, and the cleaning element 41 is hinged to the installation bracket 42. Both the riser board 43 and the auxiliary board 44 are only connected to the installation bracket 42. A function of controlling the shaft 46 to horizontally rotate along the width direction of the wire mesh 60 can also control the shaft to drive the cleaning element 41 to rotate vertically to adjust an angle of the cleaning element 41 relative to a transparent surface of the casing 11 corresponding to the launch port of the monitor 11. The shaft 46 is driven to drive the cleaning element 41 to rotate by 180° through the connection bracket 47 such that the cleaning element 41 alternately cleans the transparent surfaces of the casings 11 corresponding to the launch ports of the monitors 11 on two sides along the width of the wire mesh.

The monitoring unit 10 on one side, after completing monitoring the state of the wire mesh on the side, returns to a location near the cleaning unit 40 and controls the shaft 46 to make the end surface of the cleaning element 41 at which the spraying holes 412 is located be disposed directly opposite to the launch port of the monitor 11, and then adjust the end surface of the cleaning element 11 at which the spraying holes 412 is located to parallel the transparent surface in the casing 12 corresponding to the launch port of the monitor 11. Then gas and liquid flow into the inner cavity 411 and are mixed, a pressure in the inner cavity 411 is adjusted to adjust a flow of the spraying holes 412 to rapidly, completely, and precisely clean the transparent surface in the casing 12 corresponding to the launch port of the monitor 11. After cleaning, cleaning of the monitoring unit 10 on the other side is waited. When the monitoring unit 10 on the other side returns to an end at which the cleaning unit 40 is located, at this time, the cleaning element 41 in the cleaning unit 40 is still located away from the monitoring unit 10 on the other side. The monitor 11 rotates by 180° through the shaft 46 such that the end surface of the cleaning element 41 at which the spraying holes 412 is located is disposed directly opposite to the launch port of the monitor 11 on the other side. Then, the end surface of the cleaning element 11 at which the spraying holes 412 is located is adjusted to parallel the transparent surface in the casing 12 of the other monitoring unit 10 corresponding to the launch port of the monitor 11, and then cleaning is implemented. The above step is repeated, and the monitoring units 10 on the two sides are cleaned.

During work, an orientation of the launch port of the monitor 11 in the monitoring unit 10 on one side of the width of the wire mesh is the same as the first rotational direction of the wire mesh 60 during feeding a wire, the monitoring unit 10 reciprocally performs multi-monitoring to the wire mesh 60 in the length direction of the wire mesh 60 along a slide rail 31 of the positioning unit 30. At this time, the monitoring unit 10 on the other side is in a static state. When operation the first rotational direction of the wire mesh 60 is completed, the monitoring unit 10 on the side immediately returns to its initial location and is cleaned by spray liquid of the cleaning unit 40 disposed in front of the monitoring unit 10. When the wire mesh 60 retracts the wire, the wire mesh 60 rotates in the second rotational direction. At this time, the orientation of the launch port of the monitor 11 in the monitoring unit 10 on the other side is the same as the wire mesh 60 of the second rotational direction, and starts to prepare seamlessly monitor the wire mesh 60 on the other side of the workpiece 20 in the same working way until the wire mesh 60 of the second rotational direction completes the operation. Then, the monitoring unit 10 on the other side returns to its initial location and is cleaned by spray liquid of the cleaning unit 40 disposed in front of the monitoring unit 10. The above step is repeated, the monitoring units 10 disposed on the two sides along the width of the wire mesh 60 alternately monitor the wire mesh 60 of the first rotational direction and the wire mesh 60 of the second rotational direction when the wire mesh 60 switches from one of the first rotational direction and the second rotational direction to the other of the first rotational direction and the second rotational direction till the slicing the workpiece 20 is completed. Also, every time a set of monitoring of the rotational direction of the wire mesh 60 is completed, the cleaning unit 40 is used to clean the transparent surface of the casing 11 corresponding to the launch port of the monitor 11 to guarantee the monitoring unit 10 able to monitor the state of the wire mesh 60 in the entire process in a harsh environment with a great amount of vapor, darkness, and a lot of silicon mud during slicing. During monitoring, the monitor 11 in the monitoring unit 10 by an electromagnetic energy pulse implements detecting a message of the location of the wire mesh 60 in each wire groove, emits a signal transmitted to the reflective object of the wire mesh 60 and then reflected by the wire mesh back to the radar sensor to collect the detection signal of the wire mesh 60 in each wire groove. Then, the detection signal is transmitted to the external analyzing and processing central unit for processing to convert the collected detection signal into a digital signal, and then the digital signal is analyzed and optimized to obtain a curve chart capable of indicating the state of the wire mesh such that normality or abnormality of the state of the wire mesh can be intuitively monitored.

The present disclosure also provides an application of the above monitoring mechanism 100 in a slicing process.

A slicing machine is disposed with the above monitoring mechanism 100.

A monitoring mechanism, an application thereof, and a slicing machine disposed with the monitoring mechanism designed by the present disclosure can continuously monitor the state of the wire mesh in the slicing chamber, especially accurately and timely track and monitor in a location of wire mesh nonstop in a non-contact way in a darkroom with serious vapor and a lot of silicon mud during slicing, which provides a solid foundation for precise determination of an abnormal wire mesh. The entire structure occupies a small space in the limited slicing chamber, and the structure is simple and safe such that data of the state of the wire mesh can be obtained timely and accurately to prevent a risk of missing or wrong determination.

The monitoring units disposed on two sides along the width direction of the wire mesh can perform alternate monitoring when the wire mesh switches the first rotational direction and the second rotational direction, and an orientation of the monitor launch port and a rotational direction of the wire mesh are the same, which can seamlessly monitor the cutting state of the wire mesh entirely, and the test is accurate and in time. Further, the issue, that the monitoring unit disposed on a single side of the width direction of the wire mesh cannot monitor a state of the reversing wire mesh, and a great amount of silicon mud is sprayed to a transparent surface to influence recognition of the monitor to wire mesh location when the wire mesh reverses, is also solved.

The monitoring mechanism in the present disclosure can alternately and monitor an entire operation of the wire mesh, and the cleaning unit disposed directly opposite to the monitoring unit can clean a transparent surface that the monitor launch port in the monitoring unit faces when the wire mesh rotates reversely to guarantee monitoring in each turn is controllable and accurate. The entire structure is reasonable and controllable.

Embodiments of the present disclosure are described in detail as above. However, the contents are only the preferred embodiments of the present disclosure and cannot be deemed as a limit to an embodying range of the present disclosure. Equivalent changes and improvements according to an application range of the present disclosure shall still belong to a patent coverage range of the present disclosure.

What is claimed is:

1. A monitoring mechanism, at least comprising a monitoring unit, wherein the monitoring unit is disposed in a slicing chamber, is configured to continuously monitor a state of a wire mesh, and has no contact with the wire mesh;
   wherein the monitoring unit is at least equipped with a monitor, and a launch port of the monitor is disposed downward obliquely or vertically toward a side near the workpiece;

wherein the monitoring unit further comprises a casing and a position adjustment bar, the monitor is disposed in the casing, and a side of the casing which a launch port of the monitor faces is configured as a transparent surface;

a lower end of the position adjustment bar is connected to a top portion of the casing, an end of the position adjustment bar connected to the casing is structured as an arc surface; and controlling the arc surface of the position adjustment bar adjusts a facing position of the launch port of the monitor.

2. The monitoring mechanism according to claim 1, wherein the monitoring unit is disposed toward any region of the wire mesh other than a region where a workpiece contacts the wire mesh and is disposed near the workpiece.

3. The monitoring mechanism according to claim 1, wherein the monitoring unit is two, and the monitoring units are disposed on two side surfaces of the slicing chamber and monitor the state of the wire mesh along a length direction of the workpiece; and the monitoring units disposed on the two side surfaces of the slicing chamber are disposed oppositely.

4. The monitoring mechanism according to claim 3, wherein the monitoring units disposed on the two side surfaces of the slicing chamber monitor the wire mesh rotating along a first rotational direction and the wire mesh rotating along a second rotational direction, respectively; and the monitoring units disposed on the two side surfaces of the slicing chamber alternately monitor the state of the wire mesh when the wire mesh switches from one of the first rotational direction and the second rotational direction to the other of the first rotational direction and the second rotational direction.

5. The monitoring mechanism according to claim 1, wherein the monitor is a radar sensor or a laser sensor.

6. The monitoring mechanism according to claim 1, wherein the monitoring unit is suspended on a positioning unit disposed along a length direction of the slicing chamber, the positioning unit is disposed with a long passageway and a connection block, and the long passageway matches the connection block; and a mounting block is disposed under the connection block, an upper end surface of the mounting block is connected to a lower end surface of the connection block, and a side surface of an end portion of the mounting block is connected to an end of the position adjustment bar away from the monitor.

7. An application of the monitoring mechanism according to claim 1 during a slicing process.

8. A slicing machine, comprising the monitoring mechanism according to claim 1.

9. The monitoring mechanism according to claim 1, further comprising a cleaning unit disposed independently from the monitoring unit, wherein the cleaning unit is disposed directly opposite to the launch port of the monitor and is disposed opposite to the monitor, and the cleaning unit is disposed at an end portion of the slicing chamber to clean a transparent surface corresponding to the launch port of the monitor when the monitoring unit stops.

10. The monitoring mechanism according to claim 9, wherein the monitoring units disposed on two side surfaces of the slicing chamber correspond to two cleaning units, and are cleaned by the cleaning units respectively;

or, the monitoring units disposed on the two side surfaces of the slicing chamber share the cleaning unit, and the cleaning unit alternately cleans the monitoring units disposed on the two side surfaces of the slicing chamber.

11. The monitoring mechanism according to claim 10, wherein the cleaning unit is disposed with a cleaning element and a riser board, the riser board is disposed on one of side surfaces of the cleaning element, the cleaning element is connected to the riser board by a shaft, and the cleaning element is controlled to rotate around the shaft as a center such that the cleaning element is disposed opposite to the monitor.

12. The monitoring mechanism according to claim 11, wherein a baffle and a guide plate are disposed on a top portion of the cleaning element, the baffle is connected to the cleaning element; the guide plate is connected to the riser board; the riser board, and the baffle and the guide plate form a channel with multiple bends.

13. The monitoring mechanism according to claim 9, wherein an inner cavity and spraying holes communicating with the inner cavity are formed in the cleaning element, the inner cavity is connected to a gas pipe and a liquid pipe, and gas and liquid are mixed in the inner cavity and then flow out from the spraying holes.

14. A monitoring mechanism, at least comprising a monitoring unit, wherein the monitoring unit is disposed in a slicing chamber, is configured to continuously monitor a state of a wire mesh, and has no contact with the wire mesh;

wherein the monitoring unit is at least equipped with a monitor, and a launch port of the monitor is disposed downward obliquely or vertically toward a side near the workpiece;

wherein the monitoring unit is suspended on a positioning unit disposed along a length direction of the slicing chamber, the positioning unit is disposed with a long passageway and a connection block, and the long passageway matches the connection block; and a mounting block is disposed under the connection block, an upper end surface of the mounting block is connected to a lower end surface of the connection block, and a side surface of an end portion of the mounting block is connected to an end of the position adjustment bar away from the monitor.

15. The monitoring mechanism according to claim 14, wherein the monitoring unit is disposed toward any region of the wire mesh other than a region where a workpiece contacts the wire mesh and is disposed near the workpiece.

16. The monitoring mechanism according to claim 14, wherein the monitoring unit is two, and the monitoring units are disposed on two side surfaces of the slicing chamber and monitor the state of the wire mesh along a length direction of the workpiece; and the monitoring units disposed on the two side surfaces of the slicing chamber are disposed oppositely.

17. A monitoring mechanism, at least comprising a monitoring unit, wherein the monitoring unit is disposed in a slicing chamber, is configured to continuously monitor a state of a wire mesh, and has no contact with the wire mesh;

wherein the monitoring unit is at least equipped with a monitor, and a launch port of the monitor is disposed downward obliquely or vertically toward a side near the workpiece;

wherein the monitoring mechanism further comprises a cleaning unit disposed independently from the monitoring unit, the cleaning unit is disposed directly opposite to the launch port of the monitor and is disposed opposite to the monitor, and the cleaning unit is disposed at an end portion of the slicing chamber to clean a transparent surface corresponding to the launch port of the monitor when the monitoring unit stops.

18. The monitoring mechanism according to claim 17, wherein the monitoring unit is disposed toward any region of the wire mesh other than a region where a workpiece contacts the wire mesh and is disposed near the workpiece.

19. The monitoring mechanism according to claim 17, wherein the monitoring unit is two, and the monitoring units are disposed on two side surfaces of the slicing chamber and monitor the state of the wire mesh along a length direction of the workpiece; and the monitoring units disposed on the two side surfaces of the slicing chamber are disposed oppositely.

* * * * *